US007011105B2

(12) United States Patent
Muller

(10) Patent No.: US 7,011,105 B2
(45) Date of Patent: Mar. 14, 2006

(54) VENT VALVE

(75) Inventor: Michael Paul Muller, New South Wales (AU)

(73) Assignee: Dynamic Fluid Control (Pty) Ltd., Benoni South (ZA)

( * ) Notice: Subject to any disclaimer, the term of this patent is extended or adjusted under 35 U.S.C. 154(b) by 0 days.

(21) Appl. No.: 10/522,425

(22) PCT Filed: Jul. 31, 2002

(86) PCT No.: PCT/IB02/02956

§ 371 (c)(1),
(2), (4) Date: Jan. 25, 2005

(87) PCT Pub. No.: WO2004/015315

PCT Pub. Date: Feb. 19, 2004

(65) Prior Publication Data

US 2005/0268965 A1    Dec. 8, 2005

(51) Int. Cl.
    *F16K 24/04*    (2006.01)

(52) U.S. Cl. ..................... 137/202; 137/430
(58) Field of Classification Search ................ 137/202, 137/430
    See application file for complete search history.

(56) References Cited

U.S. PATENT DOCUMENTS

| 2,849,016 A | 8/1958 | Nations ................ 137/202 |
| 5,090,439 A | 2/1992 | Sabalvaro, III et al. .... 137/202 |
| 5,511,577 A | 4/1996 | Richards et al. ........... 137/202 |

(Continued)

FOREIGN PATENT DOCUMENTS

DE    2 047 815    9/1970

(Continued)

OTHER PUBLICATIONS

U.S. Appl. No. 10/399,058, filed Apr. 11, 2003, Richards, K.

*Primary Examiner*—Kevin Lee
(74) *Attorney, Agent, or Firm*—Woodcock Washburn LLP

(57) ABSTRACT

The invention concerns an air transfer valve which automatically vents accumulated air from pressurized liquid reticulation pipelines or vessels. The valve (10) has a housing (12) which is connectable to the pipeline or vessel. The housing has a first outlet (38) venting to atmosphere and a control chamber (60) which is exposed to internal pressure in the housing via a control chamber inlet. A first valve closure (34) can move to open and close the first outlet. This valve closure is exposed to control chamber pressure tending to move it to close the first outlet and to internal housing pressure tending to move it to open the first outlet. When the housing is pressurized the first valve closure (34) is maintained in a closed position by virtue of an unbalanced pressure force acting on it that is attributable to exposure of the valve closure to atmosphere through the first outlet. There is also a control chamber outlet (36) from the control chamber (60) to atmosphere. This outlet is larger than the control chamber inlet. The valve also incorporates a float (20) in the housing (12) which is arranged to be buoyed up by liquid entering the housing from the pipeline and a second valve closure (24) carried by the float which is arranged to open and close the control chamber outlet (36) in response to movement of the float caused by variations in the level of liquid in the housing. Downward movement of the float (20) in response to a drop in liquid level in the housing (12), attributable to accumulation of air in the housing, causes the second valve closure (24) to open the control chamber outlet (36). This allows the control chamber (60) to vent to atmosphere. The pressure in the control chamber (60) drops relative to the internal housing pressure and creates an unbalanced pressure force on the valve closure (34) which causes it to open the outlet (38). The housing can then vent to atmosphere via the outlet (38).

6 Claims, 1 Drawing Sheet

U.S. PATENT DOCUMENTS

| | | | |
|---|---|---|---|
| 4,209,032 A | 6/1980 | Drori | 137/202 |
| 4,299,248 A | 11/1981 | Becker et al. | 137/202 |
| 4,696,321 A * | 9/1987 | Reese et al. | 137/202 |

FOREIGN PATENT DOCUMENTS

| | | |
|---|---|---|
| DE | 198 15 754 A1 | 10/1999 |
| EP | 0 568 005 A1 | 11/1993 |
| FR | 2 559 233 | 8/1985 |
| WO | WO 00/53960 | 9/2000 |
| ZA | 87/5645 | 2/1998 |

\* cited by examiner

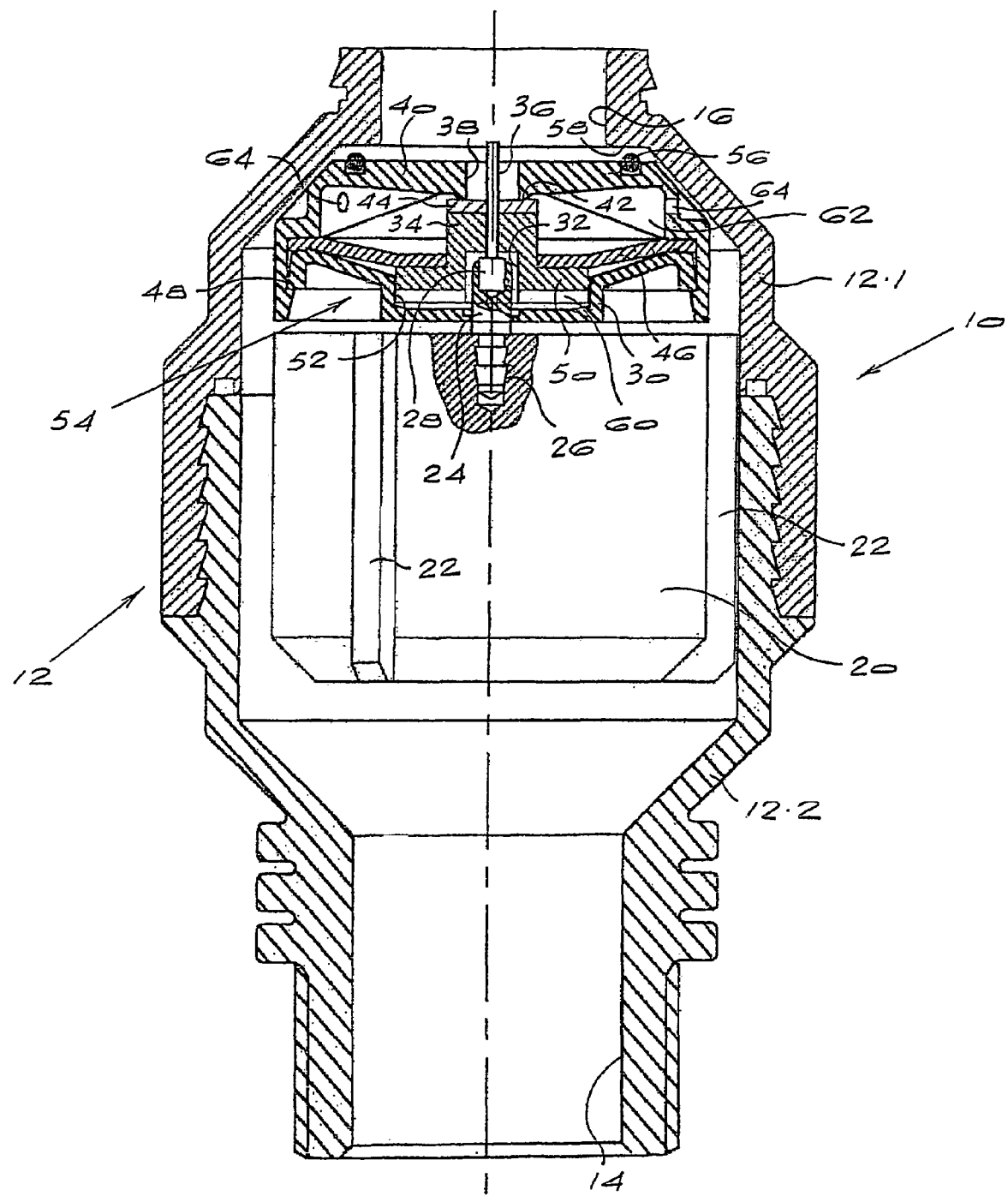

VENT VALVE

BACKGROUND TO THE INVENTION

THIS invention relates to an air transfer valve. The invention is particularly concerned with an air transfer valve, otherwise known as an air release valve, which can be used to vent air from a pipeline in which a liquid is conveyed under pressure, or from other pressurised vessels.

A known air transfer or release valve has a housing with an inlet at its lower end which is connected, typically at a high point, to a pipeline from which air is to be vented. The housing has an outlet at its upper end and in its simplest form accommodates a float. During pipeline filling, the theory is that water or other liquid in the pipeline will enter the housing and buoy up the float to seal against the outlet. Air which then accumulates in the housing during operation of the pipeline will cause the float to lose buoyancy with the result that it drops away from the outlet to allow accumulated air to vent through the outlet to atmosphere.

In practice however, it has been observed that in many cases, the float may be "blown" closed during rapid pipeline filling and then be held in a closed position by the pressure in the pipeline. This may for instance occur in a situation where the valve is installed at a high point in the pipeline which is lower than another high point further downstream. During initial filling of the pipeline, air accumulating at the high point served by the valve will vent through the valve according to theory, but if such venting is not fast enough, an air pocket may be formed beneath the valve. The air in this pocket will be pressurised rapidly by the pumping pressure and the downstream head of liquid.

The pressure differential acting across the valve float may in some instances be sufficient to "blow" the float to a closed position dynamically. The internal pipeline pressure may then maintain the float in this closed position, preventing further venting through the valve.

Similarly, if the float has been hydraulically closed, i.e. it has been buoyed up by liquid in the housing to seal against the outlet, it may remain in this condition by internal pressure in the pipeline. Still further it is possible, during rapid pipeline filling, for liquid to be lifted up by a bubble of air which enters the housing from the pipeline, and this can also cause the float to seal against the outlet. In any of these situations, the float may then be held closed by the elevated internal pressure forces until the pipeline is fully depressurised.

To address the problem of venting in internally pressurised situations it has been proposed to provide a small bleed orifice through the float to allow equalisation of the internal pressure. However a bleed orifice can only vent air very slowly and so is unable to achieve pressure equalisation fast enough for the float to drop down to allow the required rapid venting of air to take place.

A known air transfer or release valve is described in the specification of South African patent 87/5645 (ARI Flow Control Accessories). This valve has a narrow outlet slot which is covered by a flexible strip attached to a float. Downward movement of the float in response to air accumulation unpeels the strip incrementally from the slot and allows small volumes of trapped air to vent from the valve housing. A problem with this design is that only small volumes can be vented through the narrow slot.

Other solutions which have been proposed make use of mechanical linkages. One example is described in the specification of U.S. Pat. No. 5,090,439 (APCO). The air release valve described in this specification operates such that when the valve is closed, pressure-related forces acting on the closure are balanced.

Only a buoyancy force acting on a float is operative to hold the valve closure in a closed position. This facilitates valve opening even under pressurised conditions. However the design is such that when the float loses buoyancy and the valve closure does open, the pressure in the float housing, which may be quite considerable, generates an unbalanced force on the closure tending to hold it open.

It is an objective of the present invention to provide an alternative air release valve which addresses the problem of air venting in a pressurised system.

SUMMARY OF THE INVENTION

According to the invention, there is provided an air transfer valve comprising:
- a housing connectable to a pipeline or vessel which conveys or contains liquid under pressure
- a first outlet from the housing to atmosphere,
- a control chamber exposed to internal pressure in the housing via a control chamber inlet,
- a first valve closure which is movable to open and close the first outlet and which is exposed to control chamber pressure tending to move it to close the first outlet and to internal housing pressure tending to move it to open the first outlet, whereby when the housing is pressurised the first valve closure is maintained in a position closing the first outlet by virtue of an unbalanced pressure force acting on it that is attributable to exposure of the first valve closure to atmosphere through the first outlet,
- a control chamber outlet from the control chamber to atmosphere which is larger than the control chamber inlet,
- a float in the housing arranged to be buoyed up by liquid entering the housing from the pipeline or vessel,
- a second valve closure carried by the float which is arranged to open and close the control chamber outlet in response to movement of the float caused by variations in the level of liquid in the housing, the arrangement being such that downward movement of the float in response to a drop in liquid level in the housing causes the second valve closure to open the control chamber outlet, allowing the control chamber to vent to atmosphere with the result that pressure in the control chamber drops relative to the internal housing pressure and creates an unbalanced pressure force on the first valve closure which causes it to open the first outlet, thereby allowing the housing to vent to atmosphere via the first outlet.

Other features of the invention are defined in the appended claims.

BRIEF DESCRIPTION OF THE DRAWING

The invention will now be described in more detail, by way of example only, with reference to the accompanying drawing which shows a cross-sectional view of an air transfer valve according to the invention.

DESCRIPTION OF THE ILLUSTRATED EMBODIMENT

The air transfer valve 10 illustrated in the drawing has a housing 12 composed of upper and lower housing parts 12.1 and 12.2 screwed together. The lower housing part 12.2 defines an axial housing inlet 14 at its lower end and the upper housing part 12.1 defines a primary, axial outlet 16 at its upper end which vents to atmosphere.

In use, the housing inlet 14 is connected to a pipeline which conveys a liquid, for convenience referred to herein as water, under pressure, typically at a high point in the pipeline.

The housing 12 accommodates a float 20 which is guided for up and down movement in the housing 12 by means of spaced ribs 22.

A nipple 24 is engaged in an axial hole 26 in the upper surface of the float and extends above the float as illustrated. At its upper end the nipple carries a seal 28. The upper end of the nipple passes slidably through a disc-shaped control element 30 and enters a recess 32 in an upper, cap-shaped, valve closure member 34, referred to herein as the first valve closure. The first valve closure 34 carries a nozzle 36 aligned axially with the seal 28 and passing through an outlet opening 38, referred to herein as a first outlet, in a valve seat member 40. The lower end of the first outlet 38 is bounded by a valve seat 42. The upper surface of the member 34 carries a valve seal 44 aligned with the valve seat 42.

The first valve closure 34 is fixed centrally to a resilient diaphragm 46 the periphery of which is sandwiched and anchored between portions of the control element 30 and the valve seat member 40 which are clipped together at a circumferential clip formation 48. A flange 50 at the lower end of the valve closure 34 can slide up and down in a recess 52 defined by the element 30.

In combination the element 30 and member 40 form a primary valve closure 54 for closing the primary outlet 16.

The operation of the air transfer valve 10 at various stages is described below.

Pipeline Filling

The float 20 and primary valve closure 54 are initially at a low level in the housing 12.

As the pipeline fills and water enters the housing, displaced air can vent rapidly to atmosphere through the primary housing outlet 16. The rising water buoys up the float 20, causing the seal 28 to seat on the lower end of the nozzle 36. Thereafter the rising float 20 also lifts the primary valve closure with the result that an O-ring 56 carried by the member 40 of the closure 54 seats against an annular surface 58 of the housing part 12.1, thereby closing the primary opening 16.

Pipeline pressure can now build up to full working value in the housing. The internal housing pressure force acting upwardly on relevant surfaces of the primary valve closure 54 is greater than the sum of downward forces acting on the closure as a result of atmospheric pressure, gravity and internal pressure forces. The differential upward pressure force maintains the primary closure 54 in a closed position as long as the pipeline and housing are pressurised.

The diaphragm 46 separates the hollow interior of the primary valve closure 54 into a control chamber 60 beneath the diaphragm and a pressure space 62 above the diaphragm. Internal housing pressure has access to the control chamber 60 through a control chamber inlet formed by an annular clearance or gap which exists between the nipple 24 and the opening in the element 30 through which the nipple passes. The pressure space 62 is directly exposed to internal housing pressure through spaced apart ports 64 in the member 40.

Housing pressure which exists in the space 62 tends to bias the diaphragm downwardly while pressure which exists in the control chamber 60 tends to bias the diaphragm upwardly. The inherent resilience of the diaphragm urges the first valve closure 34 against the seat 42 as illustrated in the drawing. Because a portion of the closure 34 is exposed directly to atmosphere via the first outlet 38, there is then an unbalanced, upwardly acting pressure force on the valve closure 34 which maintains it in this closed position.

Normal Operation

Air enters the housing 12 and accumulates therein under the prevailing pressure. When sufficient air has accumulated, the float 20 loses buoyancy and drops. This unseats the seal 28 from the lower end of the nozzle 36. Pressurised air in the control chamber 60 can now vent to atmosphere through the nozzle. The cross-sectional area of the control chamber inlet, i.e. the annular clearance or gap between the nipple and the opening in the element 30 through which it passes, is less than the cross-sectional area of the nozzle passage. Air can accordingly vent more rapidly through the nozzle than it can enter the control chamber 60 from the housing. As a result the pressure in the control chamber 60 drops relative to the pressure in the space 62. This gives rise to a net downward pressure force on the diaphragm 46 which deflects the diaphragm downwardly. This unseats the seal 44 of the first valve closure 34 from the valve seat 42 and allows air to vent rapidly from the housing via the relatively large first outlet 38 and the primary outlet 16.

The nozzle 36 may be seen as a second outlet which is controlled by a second valve closure, i.e. the nipple 24 and seal 28 carried by the float 20.

As air vents from the housing 12 the water level therein will rise to buoy the float 20 up again, and the process repeats itself.

It will be understood that the nipple 24 does not drop completely below the element 30 when the float drops. This ensures that a limited control chamber inlet, i.e. the annular gap between the nipple and the opening in the element 30 through which the nipple passes is always present to control the rate at which air can enter the control chamber 60.

Pipeline Draining

When the pipeline drains at the end of a pumping cycle or otherwise, pipeline pressure drops. The float 20 and primary valve closure 54 drop downwardly to their initial low positions, thereby opening the primary outlet 16 completely. At the commencement of the next pumping cycle, the sequence described above for "Pipeline Filling" will again take place.

It will be understood that the air transfer valve described above is capable of opening a fairly large vent opening, namely the first outlet 38, even when the housing 12 is internally pressurised. The described air transfer valve therefore successfully addresses the problem of air venting under pressure.

It will also be understood that the air transfer valve has been described above in an application in which it is used to vent accumulated air from a pressurised pipeline, it could equally well be used to vent air from other pressurised, liquid-containing vessels.

What is claimed is:

1. An air transfer valve comprising:
    a housing connectable to a pipeline or vessel which conveys or contains liquid under pressure
    a first outlet from the housing to atmosphere,
    a control chamber exposed to internal pressure in the housing via a control chamber inlet,
    a first valve closure which is movable to open and close the first outlet and which is exposed to control chamber pressure tending to move it to close the first outlet and to internal housing pressure tending to move it to open the first outlet, whereby when the housing is pressurised the first valve closure is maintained in a position closing the first outlet solely by virtue of an unbalanced pressure force acting on it that is attributable to exposure of the first valve closure to atmosphere through the first outlet, a control chamber outlet from the control chamber to atmosphere which is larger than the control chamber inlet, a float movable vertically in the housing and arranged to be buoyed up by liquid entering the housing from the pipeline or vessel, a second valve closure attached rigidly to the float such that vertical movement of the float directly causes the same vertical movement of the second valve closure, the second valve closure being arranged to open and close the control chamber outlet in response to movement of the float caused by variations in the level of liquid in the housing, the arrangement being such that vertical downward movement of the float in response to a drop in liquid level in the housing causes the same vertical downward movement of the second valve closure whereby the second valve closure opens the control chamber outlet to allow the control chamber to vent to atmosphere with the result that pressure in the control chamber drops relative to the internal housing pressure and creates an unbalanced pressure force on the first valve closure which causes it to open the first outlet, thereby allowing the housing to vent to atmosphere via the first outlet.

2. An air transfer valve according to claim 1 wherein the first valve closure is carried by a resilient diaphragm one side of which is exposed to pressure in the control chamber and the other side of which is exposed to internal housing pressure.

3. An air transfer valve according to claim 2 wherein the control chamber outlet extends through the first valve closure.

4. An air transfer valve according to claim 3 wherein the control chamber outlet comprises a nozzle extending through the first valve closure and the second valve closure is carried by a nipple on the float which passes through an opening in the control chamber with a clearance which forms the control chamber inlet, the cross-sectional area of the nozzle being greater than that of the clearance.

5. An air transfer valve according to claim 4 wherein the first outlet, first valve closure and control chamber form a primary closure which is arranged to be raised by the float, to seat on and close a primary outlet from the housing, when the float is buoyed up by liquid in the housing.

6. An air transfer valve according to claim 5 wherein the diaphragm spans across a hollow interior of the primary closure and subdivides that interior into the control chamber beneath the diaphragm and a space above the diaphragm which is exposed to internal housing pressure via ports in the primary closure.

* * * * *